J. E. PEDEN.
PNEUMATIC TIRE.
APPLICATION FILED AUG. 19, 1915.
1,230,508.
Patented June 19, 1917.
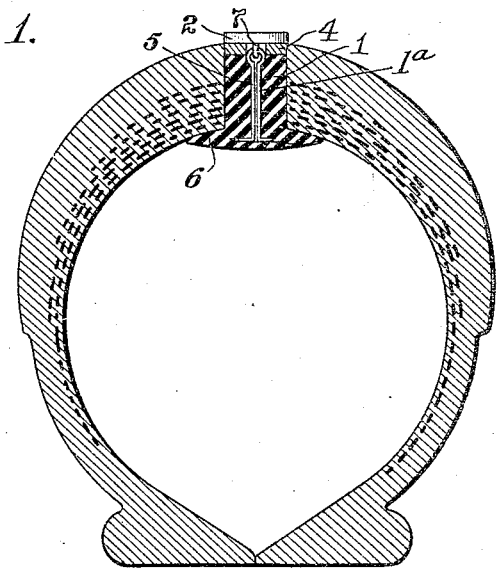
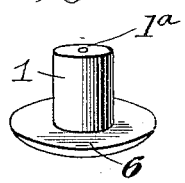
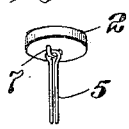
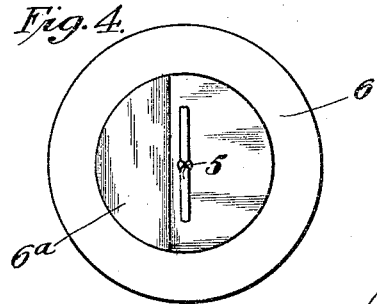
Attest:
Inventor:

UNITED STATES PATENT OFFICE.

JOSEPH EDWIN PEDEN, OF NEW YORK, N. Y., ASSIGNOR OF ONE-HALF TO THEODORE F. SMITH, OF ST. PAUL, MINNESOTA.

PNEUMATIC TIRE.

1,230,508.  Specification of Letters Patent.  Patented June 19, 1917.

Application filed August 19, 1915.  Serial No. 46,342.

*To all whom it may concern:*

Be it known that I, JOSEPH EDWIN PEDEN, a citizen of the United States, and a resident of the borough of Manhattan, city and county of New York, State of New York, have invented new and useful Improvements for Automobile-Tires, of which the following is a specification.

The primary object of this invention is the provision of improved means for causing the tread of a vehicle tire to better grip the road surface, and thereby prevent skidding, and belongs to that type of devices wherein this is accomplished by projections on the tread of the tire formed by disks, buttons, knobs or the like, attached thereto, but not integral with the tire.

In order to more fully describe my invention, reference will be had to the accompanying drawings wherein:

Figure 1, represents in vertical cross section an outer casing of a pneumatic tire equipped with one form of my improved device shown partly in vertical section, and partly in elevation;

Fig. 2, a detail perspective view of the holding plug;

Fig. 3, a detail view of the button with wire fastener attached thereto, and

Fig. 4, a plan view looking down on top of the head of the holding plug with its flap folded back to expose to view the ends of the wire fastener.

My invention, in the form shown, comprises, among other parts, a built up plug composed of a rubber stud 1 adapted to be inserted in an opening passing through the tread portion of the tire 3, and provided with a flanged head 6, adapted to abut against the inner face of the tire casing.

Secured to this stud is a disk shaped metal button 2, the lower face of which rests upon a non-heat conducting washer 4, which in turn rests upon the upper or outer end of the stud 1.

Button 2 is flexibly attached to stud 1 by a wire fastener 5, comprising two prongs and an eye portion through which latter passes a staple 7 fast to the button.

The prongs of the fastener 5 pass through a central opening 1ª in stud 1, said opening extending from the upper end of the stud to a point near the opposite end thereof. The inner terminal of the stud 1 is provided with a flap 6ª which is integral with the head of the stud and covers the opening 1ª.

The eye or upper portion of fastener 5 is drawn firmly down on the upper end of stud 1 so as to securely seat the button and washer 4, and the prongs of the fastener are bent outward at their lower ends so as to fasten the button on the stud, the ends of the prongs being covered by a flap 6ª.

The shank of stud 1 is of such length that the lower face of button 2 will be substantially flush with the outer surface of the tread of the tire casing.

Stud 1 should make a very tight fit with the casing 3, and for this purpose is made slightly larger in diameter than the hole into which it is forced.

Flap 6ª prevents the ends of the wire fastener from cutting the inner tube of the tire.

Any desired number of these devices may be applied to a tire casing, and it should be understood that while I have herein shown and described one specific embodiment only of my invention, modifications thereof may be made within the scope of what I claim as my invention.

What I claim is:—

1. A non-skid device for vehicle tires, comprising a built-up plug adapted to be inserted in the tread of the tire and consisting of a rubber stud having a longitudinal opening, a button adapted to constitute a portion of the tread of the tire, and a fastening device flexibly connected to the button and extending through said opening of the stud and clenched against said stud.

2. A non-skid device for vehicle tires comprising a built up plug adapted to be inserted in the tread of the tire and consisting of a rubber stud having a longitudinal opening, a fastening device extending through said opening and clenched against said stem, a button flexibly connected to said fastening, and a washer inserted between said button and one end of said stem.

3. A non-skid device for vehicle tires comprising a built up plug adapted to be inserted in the tread of the tire and consisting of a rubber stud having a longitudinal opening, a fastening device extending through said opening and clenched against said stem, a button flexibly connected to said fastening, and a flap formed on said stud and arranged to cover the clenched ends of said fastening device.

Signed at New York, in the county of New York and State of New York this 18th day of August A. D. 1915.

J. EDWIN PEDEN.

Witnesses:
 E. S. MITCHELL,
 PAUL H. FRANKE.

Copies of this patent may be obtained for five cents each, by addressing the "Commissioner of Patents, Washington, D. C."